United States Patent
Pichler et al.

(10) Patent No.: US 9,908,263 B2
(45) Date of Patent: Mar. 6, 2018

(54) METHOD AND APPARATUS FOR INCREASING THE INTRINSIC VISCOSITY OF A POLYCONDENSATE MELT

(71) Applicant: Next Generation Recyclingmaschinen GmbH, Feldkirchen an der Donau (AT)

(72) Inventors: Thomas Pichler, St. Peter am Wimberg (AT); David Hehenberger, Haslach an der Muehl (AT); Helmut Behoun, St. Valentin (AT); Bernhard Pichler, St. Peter am Wimberg (AT)

(73) Assignee: Next Generation Recyclingmaschinen GmbH, Feldkirchen an der Donau (AT)

( * ) Notice: Subject to any disclaimer, the term of this patent is extended or adjusted under 35 U.S.C. 154(b) by 413 days.

(21) Appl. No.: 14/427,364

(22) PCT Filed: Sep. 12, 2013

(86) PCT No.: PCT/AT2013/000151
§ 371 (c)(1),
(2) Date: Mar. 26, 2015

(87) PCT Pub. No.: WO2014/040099
PCT Pub. Date: Mar. 20, 2014

(65) Prior Publication Data
US 2015/0266209 A1    Sep. 24, 2015

(30) Foreign Application Priority Data

Sep. 12, 2012  (AT) .................................. A 997/2012

(51) Int. Cl.
*B29B 9/16*    (2006.01)
*B29B 9/06*    (2006.01)
(Continued)

(52) U.S. Cl.
CPC ................ *B29B 9/16* (2013.01); *B29B 7/421* (2013.01); *B29B 7/429* (2013.01); *B29B 7/60* (2013.01);
(Continued)

(58) Field of Classification Search
CPC .. B29B 9/16; B29B 9/06; B29B 7/429; B29B 7/60; B29B 7/421; B29C 47/6075;
(Continued)

(56) References Cited

U.S. PATENT DOCUMENTS 2,576,995 A  * 12/1951  Carvel .................... A23G 9/16
                                                    366/310
2,765,490 A  * 10/1956  Zona ...................... B29B 7/421
                                                    366/88
(Continued)

FOREIGN PATENT DOCUMENTS

CN    1867606 A     11/2006
DE    2 243 024 A1   3/1973
(Continued)

OTHER PUBLICATIONS

International Search Report of PCT/AT2013/000151, dated Jan. 14, 2014.

*Primary Examiner* — Alison L Hindenlang
*Assistant Examiner* — Emmanuel S Luk
(74) *Attorney, Agent, or Firm* — Collard & Roe, P.C.

(57) ABSTRACT

In a method and an apparatus for increasing the intrinsic viscosity of a polycondensate melt at negative pressure, the melt enters a chamber, in which a negative pressure of less than 20 mbar prevails, through a perforated plate or a screen having openings with a diameter of less than 0.5 mm. The melt passes through this chamber in free fall in thin threads and remains in a reservoir beneath the chamber for at least one minute. The melt is moved constantly in the reservoir, (Continued)

and discharged from the reservoir, by a helical mixing and discharge part.

10 Claims, 4 Drawing Sheets

(51) Int. Cl.
| | | |
|---|---|---|
| *B29B 7/42* | (2006.01) | |
| *B29B 7/60* | (2006.01) | |
| *C08G 63/78* | (2006.01) | |
| *B29C 47/60* | (2006.01) | |
| *B29C 47/62* | (2006.01) | |
| *B29C 47/00* | (2006.01) | |
| *C08G 85/00* | (2006.01) | |
| *C08J 11/06* | (2006.01) | |
| *B29B 7/66* | (2006.01) | |
| *B29B 7/72* | (2006.01) | |
| *B29K 67/00* | (2006.01) | |

(52) U.S. Cl.
CPC ............ *B29B 9/06* (2013.01); *B29C 47/0009* (2013.01); *B29C 47/6012* (2013.01); *B29C 47/6018* (2013.01); *B29C 47/6031* (2013.01); *B29C 47/6043* (2013.01); *B29C 47/6075* (2013.01); *B29C 47/62* (2013.01); *B29C 47/622* (2013.01); *C08G 63/785* (2013.01); *C08G 85/002* (2013.01); *C08J 11/06* (2013.01); *B29B 7/66* (2013.01); *B29B 7/726* (2013.01); *B29B 7/728* (2013.01); *B29K 2067/003* (2013.01); *C08J 2367/02* (2013.01); *Y02W 30/701* (2015.05)

(58) Field of Classification Search
CPC ............ B29C 47/6018; B29C 47/6012; B29C 47/6043; B29C 47/62; B29C 47/0009; B29C 47/6031

See application file for complete search history.

(56) References Cited

U.S. PATENT DOCUMENTS

| | | | | |
|---|---|---|---|---|
| 3,410,938 | A | | 11/1968 | Schippers |
| 3,583,684 | A | * | 6/1971 | Schippers ............... B29C 47/60 366/81 |
| 3,595,533 | A | * | 7/1971 | Sutter ..................... B29B 7/426 159/2.2 |
| 4,617,368 | A | * | 10/1986 | Freitag ................... C08G 63/19 528/125 |
| 5,308,562 | A | * | 5/1994 | Wohlfahrt-Laymann ............. B29B 7/7461 159/2.2 |
| 5,420,303 | A | * | 5/1995 | Roberts .................... C08F 8/46 525/285 |
| 5,440,008 | A | | 8/1995 | Ichikawa et al. |
| 6,409,948 | B1 | * | 6/2002 | Crana ..................... B29C 44/52 264/50 |
| 6,419,864 | B1 | * | 7/2002 | Scheuring ........... B29C 47/0004 264/102 |
| 6,709,147 | B1 | * | 3/2004 | Rauwendaal .......... B29B 7/421 366/80 |
| 9,550,338 | B2 | * | 1/2017 | Clark |
| 2005/0240003 | A1 | * | 10/2005 | Galewski .............. B01F 5/0451 528/480 |
| 2008/0274320 | A1 | | 11/2008 | Yokoyama et al. |
| 2009/0004325 | A1 | * | 1/2009 | Bacher ................ B29B 17/0026 425/586 |
| 2009/0292101 | A1 | * | 11/2009 | Fellinger ............... B29B 13/021 528/272 |
| 2012/0259085 | A1 | * | 10/2012 | Chamayou ............ B01J 8/0015 526/352 |
| 2014/0353871 | A1 | * | 12/2014 | Hittorff ..................... B29B 9/16 264/140 |

FOREIGN PATENT DOCUMENTS

| | | |
|---|---|---|
| EP | 1 302 501 A2 | 4/2003 |
| EP | 1 829 912 A1 | 9/2007 |
| GB | 1 126 193 A | 9/1968 |
| JP | 46-40710 B | 12/1971 |
| JP | 53-005290 A | 1/1978 |
| JP | 60-124232 A | 7/1985 |
| WO | 00/78524 A1 | 12/2000 |
| WO | 2006/059608 A1 | 6/2006 |
| WO | 2012/119165 A1 | 9/2012 |

* cited by examiner

METHOD AND APPARATUS FOR INCREASING THE INTRINSIC VISCOSITY OF A POLYCONDENSATE MELT

CROSS REFERENCE TO RELATED APPLICATIONS

This application is the National Stage of PCT/AT2013/000151 filed on Sep. 12, 2013, which claims priority under 35 U.S.C. § 119 of Austrian Application No. A 997/2012 filed on Sep. 12, 2012, the disclosure of which is incorporated by reference. The international application under PCT article 21(2) was not published in English.

The invention relates to a method for increasing the intrinsic viscosity of a polycondensate melt under negative pressure, in which the melt enters a chamber through a perforated plate or a screen with a plurality of openings with a diameter of less than 0.5 mm, in which chamber there is a pressure of less than 20 mbar, in which the melt passes through said chamber in free fall in the form of thin threads and in which the melt remains in a reservoir below the chamber.

The invention also relates to an apparatus for increasing the intrinsic viscosity of a polycondensate melt comprising a chamber under negative pressure with at least one opening, through which the melt enters into the chamber and which the melt can pass through without contacting the chamber wall, wherein a perforated plate or a screen with a plurality of openings with a diameter of less than 0.5 mm is arranged above the chamber and there is a pressure of less than 20 mbar in the chamber and a reservoir is arranged below the chamber in which reservoir there is also a vacuum.

Polycondensates (PET, PBT, PEN, PC etc.) are thermoplastics produced by polycondensation. During the polycondensation monomers link together by separating off reaction products (e.g. water) by means of a stepped reaction to form polycondensates. Polycondensation is thus associated with chain growth. Said molecule chain length substantially determines the mechanical properties of products, i.e. polycondensates. Said procedure is not only significant in relation to the production of e.g. new PET products, but is particularly important for the recycling of such products.

EP 1 302 501 A2 describes a method for promoting the post-polycondensation of polycondensation products and for removing volatile by-products present in the raw product. By means of an extrusion process the raw product is heated to a temperature 30° C. to 40° C. above the melt temperature. The melt prepared in this way is subsequently conveyed through an extrusion plate with a plurality of holes in order to give the melt a threaded form. In order to vaporize the volatile by-products a ratio of the usable free surface to the volume of the product to be processed as melt of at least 40 is selected. The melt strands with a thread form enter a chamber with reduced pressure in which the pressure is less than 0.1 bar. Below the chamber a reservoir is arranged in which a melt bath is formed from the melt threads. A portion is removed from said melt bath and fed to the supply line of the melted raw product. Said mixture of melt of raw product and the melt product already processed in the container is again fed through the extrusion plate with the plurality of holes to the chamber with reduced pressure.

WO 00/78524 A1 describes an apparatus for degassing melt, comprising a melt nozzle, which comprises an input connection point for connecting to a melt supply and a melt outlet opening which opens into a degassing chamber defined by essentially gas-impermeable walls. The degassing chamber communicates with a vacuum source and comprises a discharge opening for the essentially sealed connection with a following melt processing system. To the discharge opening of the degassing chamber a melt pump in the form of a gear pump is connected which conveys the melt. Upstream of the meshing section of the gears of the melt pump a melt distributor is arranged. The melt entering the degassing chamber enters as a continuous hose. Instead of the melt hose the melt can also be divided into a plurality of "spaghetti-like" part flows. The negative pressure in the degassing chamber can be selected freely.

From DE 22 43 024 A1 an apparatus is known for the continuous production of high-molecular polyethylene terephthalate (PET). The latter consists of a vertically arranged, cylindrical container with a melt inlet at its upper end. A product outlet is arranged at the bottom end. Furthermore, outlet connections for volatile materials open into the cylindrical container. Furthermore, in the middle of the container a shaft is arranged vertically, about which vertically fixed material exchange plates are arranged. Furthermore, above said material exchange plates there is distribution chamber and below the latter a reservoir, wherein between a distribution chamber and the reservoir of the overlying step a connecting pipe is attached through which the shaft is guided. The shaft is formed on the parts projecting through the connecting pipe as an extruder shaft conveying into the distribution chamber.

WO 2012/119165 A1 describes both a method and an apparatus for removing impurities from a plastic melt under negative pressure. In addition, the plastic melt enters through at least one opening into a chamber in which there is negative pressure, preferably pressure of less than 50 mbar. The entry of the plastic melt into the chamber is performed through a perforated plate or a screen with a plurality of openings, wherein the diameter of the openings can be less than 1.5 mm to 0.05 mm. After the passage of the plastic melt through the chamber in vertical direction the latter is collected at the bottom end in a reservoir and fed via an outlet opening of a melt pump for conveying further.

Polyesters are known to be hygroscopic and moisture binding. When processing e.g. PET in extrusion machines the presence of water causes hydrolysis, i.e. polymer chains are split, which reduces the intrinsic viscosity. In order to minimize this damage to the material it is usual to dry PET prior to processing in extruders. However, it cannot be completely prevented.

It is also known that leaving polyester to dwell at a high temperature and in a vacuum or inert gas causes polycondensation and in this way the viscosity of the polyester is increased. The known methods of melt polycondensation or solid phase polycondensation or a combination of both are usually used for the production of high-molecular polyester from low-molecular starting material. During the solid phase polycondensation the output material has to be provided in solid form as granulate or cleaned ground material with sufficient bulk weight. Other forms of PET such as for example fibers or films have to be brought into granulate form by means of a material-damaging and high energy-consuming extrusion process in order to be subjective to solid phase condensation. For further processing the starting material has to be heated, wherein at the crystallization temperature (80° C.-120° C.) there is adhesion between the granulate grains. To prevent this the material is firstly fed into so-called crystallizer in which it is heated under continuous stirring above the so-called crystallization temperature. The now pourable material can then be fed into the solid phase condensation container, where it is heated further to about 190° C. to 250° C. and remains under negative pressure or insert gas for several hours until the desired intrinsic viscosity is reached. Said processes are designed to be discontinuous, semi-continuous and continuous.

In existing methods of melt polycondensation polyester melt dwells at temperatures of about 265° C. to 300° C. and under a high vacuum of about 1 mbar often for several hours in order to achieve the desire intrinsic viscosity. Said methods are mainly used for the production of new products and are not suitable for recycling polyester.

The aim of plastic recycling in terms of reusing material is in the broadest sense to produce a new product from existing waste materials. Thermoplastics are generally reshaped to form recycled materials and then shaped again into the final product. Each reshaping generally involves a heating and cooling process. For many plastics each heating process causes irreversible damage to the polymer and said heating and cooling processes use a large amount of energy and result in a lower quality polymer.

The underlying objective of the invention is to provide an energy-saving process for recycling polycondensates such as polyester, by means of which the quality of the polycondensate can be improved and which enables the production of high-quality polymers from low-molecular waste materials.

Said objective is achieved by a method of the aforementioned kind in that the melt remains in the reservoir for at least one minute and wherein the melt in the reservoir is moved continuously by a preferably helical mixing and discharge element under vacuum and aligned in a horizontal position and in that the mixing and discharge element in the reservoir is not completely covered by the melt and the surface of the melt is continually torn up by a rotational movement of the mixing and discharge element and repeatedly renewed and in that the polycondensation started on the thin threads is continued in the melt bath with the dwelling period and continuous movement and thereby polymer chain growth occurs and thereby there is a further increase in the intrinsic viscosity, and the melt is discharged out of the reservoir by the mixing and discharge element In an apparatus of the aforementioned kind said objective is achieved in that in the reservoir a preferably helical mixing and discharge element is arranged which is aligned in a horizontal position, which is arranged for tearing up and repeatedly renewing the surface of the melt by a rotational movement of the mixing and discharge element (27) in the reservoir (19) and in that the reservoir forms a reaction chamber for the melt and in that in conveying direction of the mixing and discharge element a collecting line is arranged adjoining the reservoir.

In the method according to the invention and the apparatus according to the invention for increasing the intrinsic viscosity (iV) of polycondensates by means of melt polycondensation the melt is inserted into a reaction chamber via a perforated plate or a perforated screen, said reaction chamber being under negative pressure or filled with an inert gas, and left to remain there for a specific period until the melt has a desired intrinsic viscosity, and is then discharged e.g. via a perforated plate or a shaping plastic tool.

An increase in the molecular weight is influenced by parameters such as temperature, vacuum pressure, dwelling time and the melt surface and its continuous renewal. In order to make said reaction as economical as possible an optimum technical solution comprising the correct coordination of the influencing factors is significant.

By means of the method according to the invention and the apparatus according to the invention it is possible to separate from the plastic melt not only impurities such as water but also other impurities such as e.g. solvents, cleaning agents or in general moisture and vaporizing components and/or air which occur during the production or recycling of plastic materials.

The advantages of the invention are described in the following by way of example with regard to recycling PET, however the invention should not be considered to be restricted to recycling and/or PET or the specifically described construction of the apparatus.

During recycling PET materials are firstly chopped up, possibly cleaned, melted, degassed and filtered as known from the prior art. After the filtration the melt is conveyed via a temperature-controlled melt line e.g. to a perforated plate. By setting the optimum temperature and by means of the established pressure the melt is pushed through the perforated plate. In the perforated plate there is a variable number of small holes corresponding to the required flow-rate. For PET the latter have a diameter of e.g. 0.3 mm. The perforated plate could however also be configured for example as a screen, grid or the like. Particularly good results are achieved with a diameter of the openings that is less than 0.5 mm, preferably between 0.05 and 0.5 mm, particularly preferably between 0.1 and 0.3 mm, according to the desired throughput and result. For holes that are not round the area of the latter corresponds to the area of holes with the aforementioned diameters.

After the perforated plate the threads, which become even thinner under the effect of gravity, pass into a chamber which is under negative pressure, preferably vacuum. The chamber can also be filled with dried gas or rinsed with dried gas. Depending on the desired intrinsic viscosity the vacuum in the chamber can be selected to be higher or lower. Preferably, the pressure used is between 0.5 and 20 mbar, as good results can be achieved at these pressures, said pressures can also be produced by commercially available vacuum pumps. The reaction takes place in said chamber. The water diffuses through the vacuum from inside the melt to the surface. By means of the vacuum and the temperature the water is converted into water vapor and solvents or the like can be vaporized and/or air can escape from the melt and be removed from the chamber. If the apparatus according to the invention is arranged after an extruder for example, the shortened molecular chains can be lengthened again. The resulting plastic quality can be influenced by a suitable configuration of the apparatus and the method.

For example, the apparatus according to the invention can be configured for processing PET so that a perforated plate is used with 3000 holes each with a 0.3 mm diameter and a free falling height of 2 meters in the chamber under a negative pressure of 3 mbar. This produces from the effect of gravity and vacuum a melt thread diameter of about 0.2 mm, which results in very good purification or degassing of the melt.

Of course, according to the desired flow-rate more or fewer than 3000 holes can be used, preferably between 1000 and 5000 holes, for example 2000 or 4000 holes can be used per perforated plate or screen. Larger or smaller heights than 2 meters can also be used. Preferably, heights of 1.5 m to 4 m, in particular heights of 2 in, 2.5 m, 3 m or 3.5 m.

The melt falls downwards in the form of thin melt threads through the chamber and impurities such as water diffuse to the surface and vaporize because of the temperature and the negative pressure. Because of the unhindered downwards vertical movement of the thin melt threads in the chamber there is a significant increase in the active melt surface.

By removing water from the PET-melt the short molecules chains link together to form longer chains which increases the molecular weight and thus increases the intrinsic viscosity.

The melt collects at the lower end of the chamber in a reservoir and is conveyed e.g. by a discharge extruder after a dwelling period of preferably at least one minute, preferably at least three or four minutes, to a granulating apparatus, a forming tool or into a further chamber with the same or similar structure, wherein a heating device can be arranged at the end of the first or at the beginning of the next chamber or at some point on the route between said two chambers, by means of which heating device the plastic can be kept at melt temperature, i.e. a temperature, at which the plastic flows plastically.

The method according to the invention and the apparatus according to the invention can be easily adapted and manufactured or configured individually to customer requirements, wherein existing systems can also be equipped or retrofitted for the production or recycling of plastics.

Further preferred embodiments of the invention are the subject matter of the remaining subclaims.

Further features and advantages of the invention are explained in the following description of preferred example embodiments of the invention with reference to the accompanying drawings. In the latter.

Figure 1:
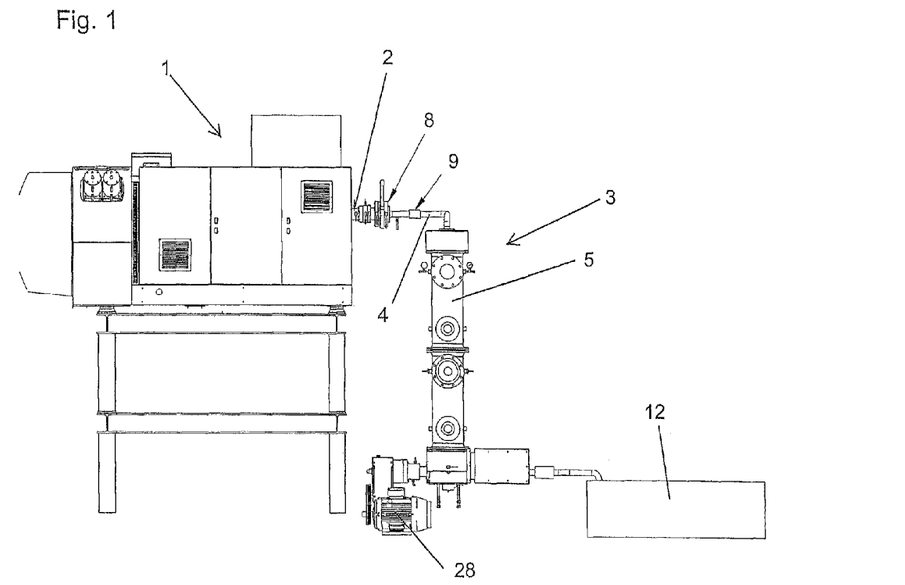
FIG. 1 shows a system for recycling plastic with an apparatus according to the invention in elevation.
Figure 2:
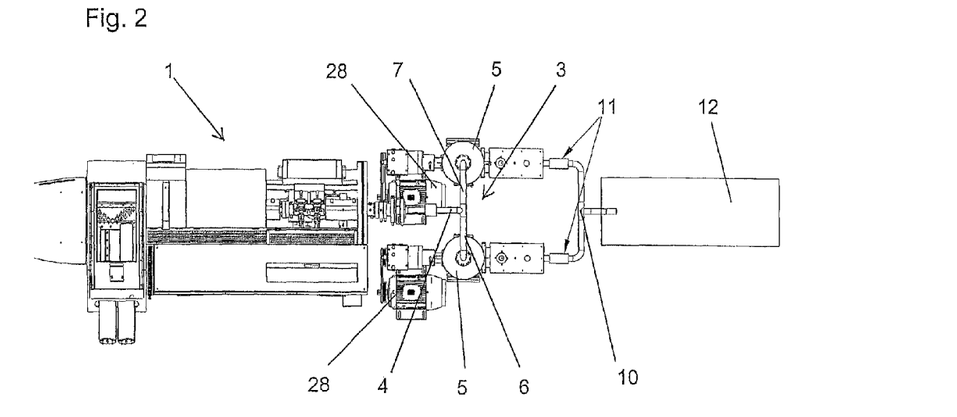
FIG. 2 shows the system of FIG. 1 in plan view.

FIGS. 1 and 2 show a recycling system by way of example which comprises in the assembly denoted by the number 1 an apparatus for chopping up and extruding polycondensates, for example fibers, films, PET thermoforming films or other polycondensates. Said assembly can be built in a manner known from the prior art and is not the subject matter of the present invention. The recycling system described is for recycling PET for example but is not restricted to this plastic.

For example PET recycling products or even PET new material granulate can be fed into an extruder as required through a loading system (single-shaft shredder, cutter compactor, silo, metering system for granulates etc.). Depending on the loading system the output material (fibers, starter lumps, bottle flakes, films, granulate, etc.) is chopped up by a single-shaft shredder or cutter compactor, compacted and optionally the surfaces are dehumidified or the granulate is fed into the extruder through the metering system.

It has been shown to be very advantageous if the extruder described above is equipped with a degassing device known from the prior art. As the water bound into the PET in a non-predried state causes hydrolytic degradation during the extrusion, it is necessary to dehumidify the PET as soon as it reaches the melt state. The reduction of the intrinsic viscosity by hydrolysis which has already taken place during the melting process can no longer be compensated but by removing any existing water from the melt further iV degradation can be largely prevented. It is even more advantageous if immediately after the degassing device of the extruder a further degassing device is arranged and if there is a negative pressure of 2 to 5 mbar in the degassing areas. Following the extrusion there is a filtering unit which filters the PET-melt to the required degree of purity and homogeneity.

The melt pressure required for feeding the now following melt reactor is applied by a melting extruder or by a melt pump 9, which can be arranged after the filtering unit.

The components of the system described above are not absolutely necessary for the invention, although they have a positive influence on the effect of the method according to the invention and the apparatus according to the invention.

To the output 2 of the extruder or the filtering unit, a screen changer 8 comprising a screen and the melt pump 9 an apparatus 3 according to the invention is connected for removing impurities from the melt coming from the extruder via a supply or melt line 4. The melt line 4, depending on the system, requirements or available space runs either horizontally directly to one or more containers 5 or at first vertically upwards along a container 5.

The apparatus 3 in the shown example embodiment consists of a total of two containers 5, which are arranged next to one another in parallel. A distribution line 6, 7 leads from the supply line 4 to a respective container 5. After the two containers 5 a collecting line 10 runs to a granulating device 12. The granulating device 12 can be constructed in a manner known from the prior art and is not the subject matter of the present invention.

Figure 3:
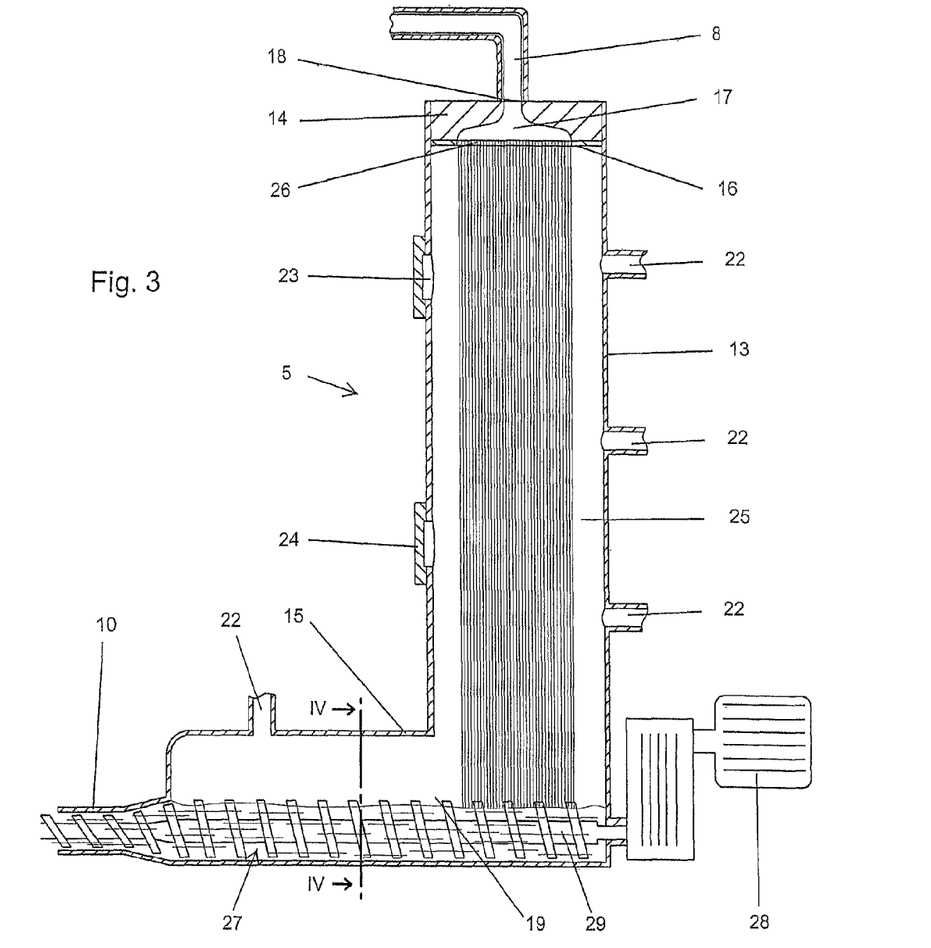
FIG. 3 shows a container according to the invention in cross-section

The containers 5 are constructed for example as represented in FIG. 3 and consist of a preferably cylindrical pipe 13. By varying the length of the cylindrical pipe 13 different falling heights can be produced in the container 5 in a simple manner. At the upper end of the pipe 13 a head part 14 is attached and at the bottom end of the pipe 13 there is a foot part 15 with a reservoir 19 forming a reaction chamber.

In the head part 14 in the area connecting to the pipe 13 a perforated plate or a screen 16 is arranged with a plurality of openings 26. In flow direction before the perforated plate or the screen 16 there is a distribution chamber 17, which is connected via a connection opening 18 to one of the distributing lines 6 or 7. In the distribution chamber 17 in front of the perforated plate or the screen 16 a not shown pressure distributor screen can be installed in order to distribute the pressure as evenly as possible on the whole perforated plate or screen 16.

The melt, e.g. PET-melt, is pushed by means of the pressure generated by the extruder or the melt pump 9 through the perforated plate or the screen 16. When the melt is pressed through the perforated plate or the screen 16 the thin melt threads fall down freely due to gravity without contacting the wall of the chamber 25 formed in the pipes 13. The perforated plate or the screen 16 comprises, according to the flow-rate, a variable number of small openings. With a hole diameter of about 300 μm and a mass flow-rate of about 70 kg/h for example about 2000 holes are necessary to achieve good results.

The dwelling time of the melt in the chamber 25 can be influenced by the length of the container 5 and in particular of the reservoir 19, wherein also the diameter of the thin melt threads, which become thinner under the effect of gravity, and thus their weight influences the dwelling period as well as the temperature which influences the viscosity of the melt. As a rule the higher the temperature the faster the polycondensation. For PET the ideal temperature in the reservoir 19 is for example preferably between 270° and 300° C. By means of a parallel arrangement of the containers 5 the flow-rate of the apparatus according to the invention can be changed. The quality of the polycondensation and also the purification of the melt can also be improved for example by two or more containers 5 arranged behind one another.

A very high surface-to-volume ratio of the melt is achieved by the large number of small holes. Under the effect of gravity the melt threads become even thinner depending on the height of the container 5, whereby the surface-to-volume ratio is increased considerably further. In perfect coordination with the large melt surface, the dwelling time, the high temperature and the vacuum the purification of the melt and also the polycondensation reaction of the melt is excellent. The effect of the temperature and vacuum causes the threads to be drawn individually in a melt state to the reservoir 19 of the container 5.

Owing to the high surface-to-volume ratio of the melt, the high vacuum and the high temperature in the reactor e.g. water molecules, other reaction products or volatile materials can diffuse in a short period into the surface of the melt threads. In the gaseous state said materials can be removed rapidly by the vacuum applied to the reactor.

During the polycondensation reaction the molecule chains lengthen and reaction products separate off which leads to an increase in the intrinsic viscosity.

As the falling time of the melt threads in the chamber 25 may not be long enough for a sufficient degree of polycondensation, the threads in the reservoir 19 located in the foot part 15 are returned to a melt bath. In the melt bath there is a helical, mixing and discharge element driven by a motor 28, e.g. a discharge extruder 27, which is preferably configured so that in addition to the conveying effect and building up of pressure for further processing a good mixing result is achieved by repeatedly renewing the surface of the melt. Instead of a discharge extruder a discharge screw or the like can be provided. As the melt is continually in motion the thermal degradation of the melt is reduced to a minimum.

The melt is pumped to the collecting line 10 from the discharge extruder 27. By means of subsequent strand granulation 12 the melt can be processed into high-quality granulate. By means of a tool following the discharge extruder 27 products such as strapping tapes, fibers, films etc. can easily be made directly from the recycled PET. An application of this kind has the advantage that the recycled PET can be processed directly into high-quality products without predrying and without SSP (solid state polymerization) by melting only once.

The head part 14 and the foot part 15 are connected, e.g. screwed, to the pipe 13. On the pipe 13 there are also additional connection points 22 to a not shown vacuum pump and possibly assembly or service openings 23 and/or inspection glasses 24.

Instead of a vacuum pump lines can also be connected to the connection points for the continual or intermittent supply and removal of possibly inert dried gas in order to remove the separated impurities.

In trials it has been established that the polycondensation of PET occurs most rapidly at a negative pressure of 0.5 to 5 mbar and a temperature of preferably 270° to 300° C. In each case the negative pressure should be less than 20 mbar. As the negative pressure has a very significant effect on the intrinsic viscosity of the PET produced, by means of a device 11 arranged after the discharge extruder 27 for measuring in-line viscosity the intrinsic viscosity can be controlled very easily and rapidly by changing the negative pressure. By means of the particular design of the foot part 15 the dwelling time of the melt under vacuum can be influenced by the filling level in the reservoir 19. Longer dwelling times bring about greater polymer chain growth and thus a further increase in the intrinsic viscosity.

The filling level of the melt bath in the reservoir 19 is controlled by a suitable sensor, which in turn controls the discharge extruder 27. The polycondensation of the thin melt threads started by high vacuum and temperature is then continued in the melt bath by a dwelling time and keeping the melt in motion by the mixing and discharge element 27. According to the requirements the melt bath can be so high that the discharge extruder 27 is covered completely or only partly by melt. However, it is an advantage if the helical mixing and discharge element 27 is not fully covered by melt, if by means of the rotational movement of the discharge element the melt is continually torn up and the surface has to be renewed.

By means of the device located after the discharge extruder 27 for measuring inline viscosity 11, as described above, the desired intrinsic viscosity can be adjusted or controlled by means of the corresponding filling level in the reservoir 19 and the resulting dwelling time.

Trials have shown that the combination of melt threads and melt bath results in an extremely efficient polycondensation and thus even with comparatively short dwelling times substantial increases in the intrinsic viscosity are possible.

Figure 5:
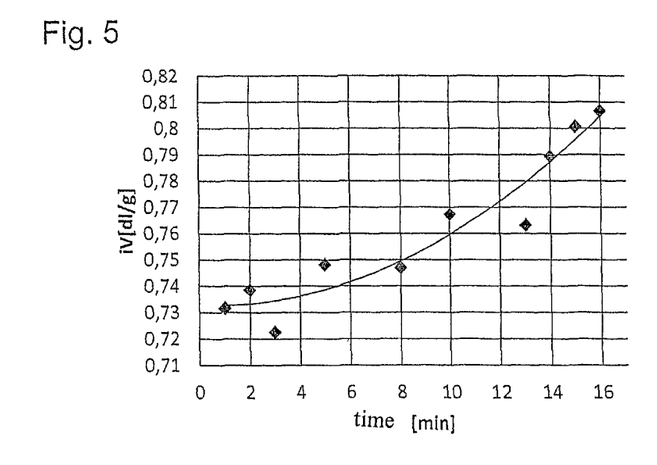
FIG. 5 shows a diagram, which shows the effect of the dwelling time in the reactor on the iV value.

FIG. 5 shows the effect of the dwelling time in the container 5 on the iV value. At lower or higher iV output values there is a comparable improvement. It should be noted that from a dwelling time of about 1 minute there is an increase in the intrinsic viscosity. Substantial improvements are achieved after only a few minutes, in particular from three or four minutes. According to the desired result or improvement of the iV value dwelling times of six, eight, ten or more minutes up to 12, 14 or 16 minutes are possible or advantageous. In comparison known melt reactors operate with dwelling times of 30 min to several hours to achieve similar results.

By means of the particular configuration of the helical mixing and discharge element 27 in the reservoir 19 the reaction process can be optimized even further.

Figure 6:
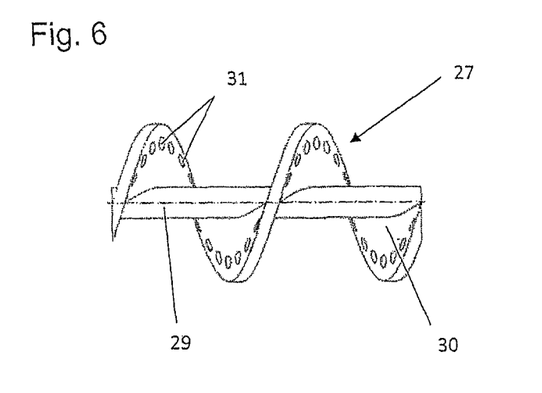
FIGS. 6 to 12 shows alternative embodiments of helical mixing and discharge elements.

Thus a small bore diameter of the shaft 29 in relation to the total diameter and a specially designed spiral, for example with holes or recesses 31 on the webs 30 in the region of the chamber 19 as shown in FIG. 6 results in a raised surface and thus surface renewal of the PET melt. In this way the diffusion process for removing the separated products (e.g. water) is made considerably easier and the polymerization process is thus accelerated.

FIGS. 7 to 12 show further preferred embodiments of shafts.

Figure 7:
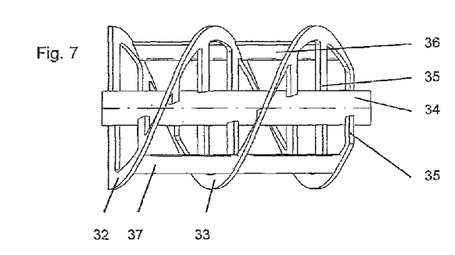
Figure 8:
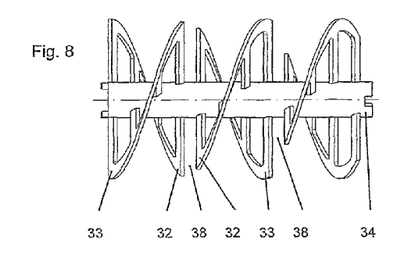

In the embodiments of FIGS. 7 and 8 the webs 32, 33 wind in the form of a double helix about the core 34 of the shaft and are held at a distance from the latter by means of spokes 35. By means of additional, axially parallel webs 36, 37 not only is the shaft reinforced as a whole but also the mixing of the melt is improved and the surface is raised. Whereas the shaft shown in FIG. 7 has continuous webs 32, 33, in the embodiment of FIG. 8 the webs 32, 33 are disconnected (twice in the embodiment shown). Into the thus formed, preferably substantially radially aligned, slits 38 not shown pins or the like can project from the outside, for example from a screw tube, which improve the mixing of the melt further.

Figure 9:
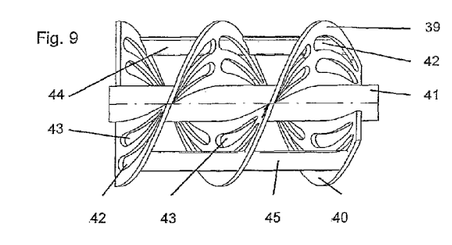
Figure 10:
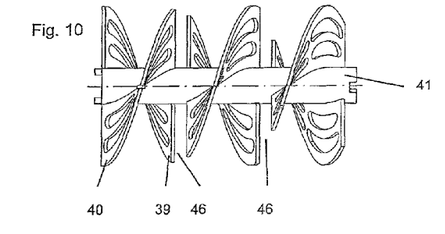

The embodiments of FIGS. 9 and 10 are constructed in a similar way to those of FIGS. 7 and 8 but the webs 39, 40 wound in the form of a double helix about the core 41 of the shaft go up to the core 41 of the shaft and have part-circular openings 42, 43. Instead of the axially parallel running webs 44, 45 in the embodiment of FIG. 9 in the embodiment of FIG. 10 there are slots 46 for pins or the like projecting from the outside between the disconnected webs 39, 40.

Figure 11:
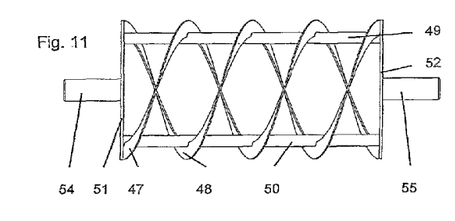
Figure 12:
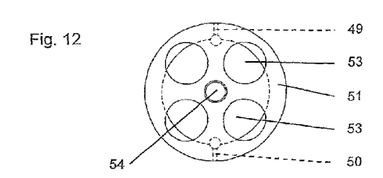

FIGS. 11 and 12 show a shaft without a core, in which webs 47, 48 are arranged in the form of a double helix, which are connected to one another by means of axially parallel webs 49, 50 and are connected to end discs 51, 52. In the discs 51, 52 there are openings 53 for the passage of melt and axial pins 54, 55, by means of which the shaft can be mounted or connected to adjoining shafts.

Figure 4:
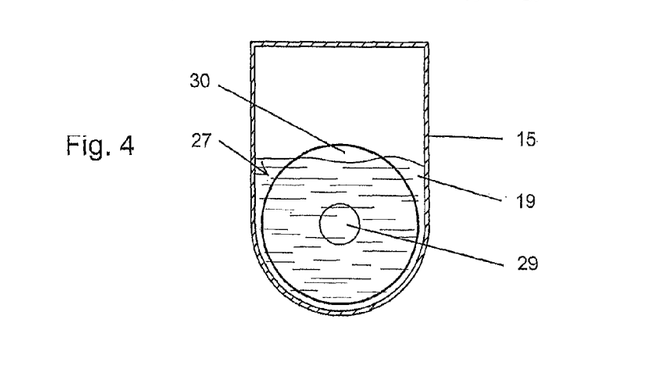
FIG. 4 shows a cross-section of the container of FIG. 3 along the line IV-IV.

The helical mixing and discharge element 27 in the reservoir 19 according to the embodiment of FIGS. 3 and 4 can be configured exclusively like the embodiments of shafts shown in FIGS. 6 to 12, but can also comprise any combinations of the latter. For example, the embodiments of FIGS. 7 and 9 can be used at the beginning and end of the helical mixing and discharge element 27 as entry and conveying elements, whereas the embodiments of FIGS. 8 and 10 are used in the middle part of the helical mixing and discharge element 27 as mixing segments.

By means of the invention individual or all of the following advantages can be achieved:
Recycling of various different kinds of input materials (fibers, films, bottle flakes, straps, starter material cakes etc.);
In addition to granulate by using shaping tools a high quality plastic product can also be produced directly;
Adjustable intrinsic viscosity for e.g. polyester;
Intrinsic viscosity and purity of the output product can be higher than that of the input product (upcycling);
No crystallization and predrying of polyester input material is necessary;
No subsequent treatment of polyester material by SSP is necessary;
Relatively low system costs;
Very short processing time for the material;
High energy efficiency of the whole process in relation to the output material quality compared to known processes, as heating is only required once;
Existing recycling systems can still be used without many adjustments and can be retrofitted with the apparatus according to the invention.

The invention claimed is:

1. A method for increasing the intrinsic viscosity of a polycondensate melt under negative pressure, in which the melt enters a chamber via a connection opening and through a perforated plate or a screen with a plurality of openings with a diameter of less than 0.5 mm, in which chamber there is a pressure of less than 20 mbar, wherein the melt passes through said chamber in free fall in the form of thin threads, and wherein the thin threads are returned to a melt bath and the melt remains in a reservoir below the chamber, wherein the melt remains in the reservoir for at least one minute and the melt in the reservoir is moved continually by a mixing and discharge element under a pressure of less than 20 mbar and the mixing and discharge element is aligned in a horizontal position, wherein a height of the melt bath in the reservoir is selected to be so high that the mixing and discharge element in the reservoir is not completely covered by the melt and thereby the surface of the melt is repeatedly torn up by a rotational movement of the mixing and discharge element and repeatedly renewed, and the polycondensation started with the thin threads is continued in the melt bath by the dwelling period and continuous movement, and thus causes polymer chain growth and thereby increases the intrinsic viscosity further and the melt is discharged from the reservoir laterally by the mixing and discharge element.

2. The method as claimed in claim 1, wherein in the chamber there is a pressure of below 10 mbar.

3. The method as claimed in claim 1, wherein there is a dried gas or an inert gas in the chamber.

4. The method as claimed in claim 1, wherein the melt enters the chamber through openings with a diameter of between 0.05 and 0.5 mm.

5. The method as claimed in claim 1, wherein the dwelling time of the melt in the reservoir is at least 1 to 2 minutes.

6. The method as claimed in claim 5, wherein the dwelling time of the melt in the reservoir is up to twelve, fourteen or sixteen minutes.

7. The method as claimed in claim 1, wherein after the mixing and discharge element an in-line viscosity measurement of the melt is performed and the intrinsic viscosity of the melt is controlled by changing the negative pressure.

8. The method as claimed in claim 1, wherein the melt passes through at least two chambers consecutively.

9. The method as claimed in claim 8, wherein the melt between two chambers is kept at the required melt temperature by a temperature control device.

10. The method as claimed in claim 1, wherein the mixing and discharge element discharges the melt from the reservoir into a collecting line, and
wherein the mixing and discharge element extends into the connecting line.

* * * * *